United States Patent [19]

Buhrer et al.

[11] Patent Number: 4,991,938

[45] Date of Patent: Feb. 12, 1991

[54] QUASI-ACHROMATIC OPTICAL ISOLATORS AND CIRCULATORS USING PRISMS WITH TOTAL INTERNAL FRESNEL REFLECTION

[75] Inventors: Carl F. Buhrer, Framingham; W. John Carlsen, Boston, both of Mass.

[73] Assignee: GTE Laboratories Incorporated, Waltham, Mass.

[21] Appl. No.: 335,146

[22] Filed: Apr. 7, 1989

[51] Int. Cl.⁵ .................... G02B 5/30; G02B 27/28; G02F 1/09
[52] U.S. Cl. .................. 350/403; 350/402; 350/405; 350/377
[58] Field of Search .............. 350/403, 375, 374, 394, 350/400, 401, 402, 395, 370, 405, 377, 170, 376, 378, 355; 372/70.3

[56] References Cited

U.S. PATENT DOCUMENTS

| | | | |
|---|---|---|---|
| 3,558,215 | 1/1971 | De Lang et al. | 350/377 X |
| 4,650,289 | 3/1987 | Kuwahara | 350/375 |
| 4,671,613 | 6/1987 | Buhrer | 350/174 |
| 4,702,557 | 10/1987 | Beckmann et al. | 350/330 |
| 4,756,607 | 7/1988 | Watanabe et al. | 350/375 |
| 4,762,384 | 8/1988 | Hegarty et al. | 350/96.12 |
| 4,770,505 | 9/1988 | Okazaki | 350/377 |

FOREIGN PATENT DOCUMENTS 0279412 8/1988 European Pat. Off. .
0283227 9/1988 European Pat. Off. .

OTHER PUBLICATIONS

H. Iwamura, S. Hayashi & H. Iwasaki, "A Compact Optical Isolator Using a YIG Crystal for Near Infra-red Radiation," *Optical and Quantum Electronics*, vol. 10, pp. 393–398 (1978).

A. Shibukawa & M. Kobayashi, "Compact Optical Circulator for Near-infrared Region," *Electron. Lett.*, vol. 14, No. 25, pp. 816–817 (1978).

T. Matsumoto, "Polarisation-independent Optical Circulator Coupled with Multi-mode Fibers," *Electron. Lett.*, vol. 16, No. 1, pp. 8–9 (1980).

(List continued on next page.)

Primary Examiner—Bruce Y. Arnold
Assistant Examiner—David R. Parsons
Attorney, Agent, or Firm—Victor F. Lohmann, III; James J. Cannon, Jr.

[57] ABSTRACT

A quasi-achromatic configuration of two nonreciprocal optical rotators coupled by linear retardation elements based on total internal Fresnel reflection, such that wavelength or temperature effects on the optical rotator elements compensate one another to give quasi-achromatic isolation and/or temperature stability when this optical configuration is incorporated into an optical isolator or circulator. A quasi-achromatic optical isolator through which a light beam within a wavelength range about a nominal wavelength may propagate is made from a sequence of elements having a first plane polarizer accepting said light beam as an input, said light beam then passing through in sequence, a first Faraday rotator, a first wavelength independent linear retardation element, a second Faraday rotator, a second wavelength independent linear retardation element, and said light beam exiting said isolator undiminished in intensity through a second plane polarizer. A quasi-achromatic optical circulator having first, second, third and fourth ports is provided such that said circulator may accept a light beam within a wavelength range about a nominal wavelength and direct it to a succeeding port. A light beam enters said circulator through a first polarizing beam splitter adjacent to said first and third ports and passes through sequentially a first Faraday rotator, a first wavelength independent linear retardation element, a second Faraday rotator, a second wavelength independent linear retardation element and a second polarizing beam splitter adjacent to said second and fourth ports of said circulator, whereby said light beam is transmitted undiminished in intensity to the next succeeding port.

22 Claims, 4 Drawing Sheets

OTHER PUBLICATIONS

M. Shirasaki & T. Obokata, "Compact Polarization-independent Optical Circulator," *Appl. Opt.*, vol. 20, No. 15, pp. 2683–2687 (1981).

W. L. Emkey, "Polarization-independent Optical Circulator for 1.3 μm," *J. Lightwave Tech.*, vol. LT-1, No. 3, pp. 466–469 (1983).

M. Shirasaki & K. Asama, "Compact Optical Isolator for Fibers Using Birefringent Wedges," *Appl. Opt.*, vol. 21, No. 23, pp. 4296–4299 (1982).

S. Matsumoto & S. Suzuki, "Temperature-stable Faraday Rotator Material and Its Use in High-performance Optical Isolators," *Appl. Opt.*, vol. 25, No. 12 (Jun. 1986).

M. G. Destriau, and M. J. Prouteau, "Realisation d'un quart d'onde Quasi Achromatique Par Juxtaposition de Deux Lames Crystallines de Meme Nature," *Le Journal de Physique et le Radium, Serie VIII, Tome X (Fevrier (1949).*

R. C. Jones, "A New Calculus for the Treatment of Optical Systems I–Description and Discussion of the Calculus," *J. Opt. Soc. Amer.*, vol. 31, pp. 488–493 (1941).

S. E. Harris, E. O. Ammann & I. C. Chang, "Optical Network Synthesis Using Birefringent Crystals Synthesis of Lossless Networks of Equal Length Crystals," *J. Optical Soc. Amer.*, vol. 54, No. 10, pp. 1267–1279 (1964).

C. S. Hurlbut, Jr., & J. L. Rosenfeld, "Monochromator Utilizing the Rotary Power of Quartz," *Amer. Minerol.*, vol. 7, pp. 158–165 (1952).

J. W. Evans, "Sole Birefringent Filter," *J. Opt. Soc. Amer.*, vol. 48, p. 142 (1958).

A. Ghosh & A. K. Chakraborty, "A Mixed Sole Birefringent Filter," *Optica Acta*, vol. 29, No. 10, pp. 1407–1412 (1982).

C. M. McIntyre & S. E. Harris, "Achromatic Wave Plates for the Visible Spectrum," *J. Optical Soc. Amer.*, vol. 58, No. 12, pp. 1575–1580 (1968).

M. Shiraski, H. Nakajima, K. Asama, "Compact Optical Isolator for Fibers Suitable for Operating in the 1.3 1.5 μm Wavelength Region," *Digest of Conference on Lasers & Electro-Optics*, (Optical Society of America, Wash., DC 1983), paper THA2.

Cascaded optical isolator configuration having high-isolation characteristics over a wide temperature and wavelength range, Shiraishi and Kawakami, *Optics Letters*/vol. 12, No. 7/Jul. 1987, pp. 462–464.

Compact polarization-independent optical circulator, Shirasaki, Kuwahara and Obokata, *Applied Optics*, vol. 20, No. 15, Aug. 1, 1981, pp. 2683–2687.

C. F. Buhrer, "Wideband Temperature-compensated Optical Isolator or Circulator Configuration Using Two Faraday Elements," *Optics Letters*, vol. 14, No. 210, Nov. 1989.

QUASI-ACHROMATIC OPTICAL ISOLATORS AND CIRCULATORS USING PRISMS WITH TOTAL INTERNAL FRESNEL REFLECTION

CROSS-REFERENCE TO RELATED APPLICATION

This application is related to a copending application entitled, "QUASI-ACHROMATIC OPTICAL ISOLATORS AND CIRCULATORS" Ser. No. 07/331,428 filed Mar. 31, 1989 by Carl F. Buhrer, a co-inventor of the invention disclosed in this application, and assigned to the same assignee, GTE Laboratories Incorporated.

BACKGROUND OF THE INVENTION

This application pertains generally to the field of nonreciprocal optical devices such as optical isolators and optical circulators, which are constructed from materials that exhibit the optical Faraday effect. Optical isolators are commonly used to overcome the instability in semiconductor light sources caused by reflected light. Optical circulators may be used in two-way fiber optic communication systems and in other applications. In particular, this application pertains to quasi-achromatic isolators and circulators using total internal Fresnel reflection to simplify their construction.

Nonreciprocal optical devices such as isolators and circulators may be constructed from materials that exhibit the optical Faraday effect. This effect is a circular birefringence that arises from the presence within the material of a magnetization resulting from an externally applied magnetic field or from an internal spontaneous magnetization due to ferromagnetic or ferrimagnetic ordering that may be held in a saturated state by an externally applied magnetic field. In either case, it manifests itself as an optical rotatory effect upon light propagating through the material along the direction of magnetization. It is nonreciprocal in that the sense of rotation of the axes of polarization depends on the polarity of the magnetization relative to the direction of propagation.

Optical signals transmitted through fiber optic waveguides are being used for telecommunications to an ever increasing extent. They are generated by laser diodes of various types that often operate at wavelengths in the 1.28 to 1.60 $\mu$ range. Some of these lasers, especially those of the so-called distributed feedback construction, are somewhat sensitive to light returning on their output fiber whether it be from reflections of their own emissions or from another source. An optical isolator, which is a nonreciprocal two port device that passes light in one direction and absorbs light in the opposite direction, is often necessary to obtain optimum operation from these laser diode sources.

The optical circulator is a more generally applicable nonreciprocal four port device. As with the isolator, light entering the first port passes out the second port, but light entering the second port is not absorbed, and instead passes out the third port. Similarly, light entering the third port passes out the fourth port, and light entering the fourth port passes out the first port. Thus, by using any two adjacent ports a circulator can function as an isolator, but it also has the potential of permitting optical fiber transmission lines to be operated in a bidirectional mode with signals at the same or different wavelengths traveling in opposite directions simultaneously.

Basic to the operation of both optical isolators and circulators is the 45° Faraday rotation element which is usually composed of glass or a single crystal transparent over the desired wavelength range. Opposing parallel optical facets surround the active region which is within an externally applied axial magnetic field provided by adjacent permanent magnets or by a current carrying solenoid. The field strength required to obtain 45° of rotation depends on the Verdet constant of the element material. Suitable materials include diamagnetic glasses especially those with a high lead oxide content, paramagnetic glasses or cubic crystals containing ions such as trivalent cerium or terbium, and ferrimagnetic oxide crystals such as yttrium iron garnet. The latter, commonly known as YIG, is especially useful in the 1.28 $\mu$ to 1.60 $\mu$ wavelength range where many optical fiber systems operate.

In its simplest form an optical isolator consists of an input plane polarizer, a 45° Faraday element with its associated axial field magnet, and an output plane polarizer with its polarization axis rotationally orientated at 45° relative to that of the input polarizer. A compact isolator of this type using a YIG crystal has been described in the literature. Input light must be plane polarized to pass through the input polarizer after which its plane of polarization is rotated 45° by the Faraday element so that it can pass through the output polarizer. If the propagation direction is reversed, the Faraday element will rotate $-45°$ and the light passed through it will be absorbed in the output polarizer. A similar optical circulator, also using a YIG crystal, but with input and output polarization beam splitters instead of plane polarizers has also been described in the literature. Both devices require specific states of plane polarization at their ports to function optimally.

The degree of isolation obtainable with either of these nonreciprocal devices is limited by deviations of the Faraday element rotation from its nominal 45°. The element is designed for some nominal wavelength, and in general it will have a greater rotation at shorter and a lesser rotation at longer wavelengths. Also, some Faraday elements such as YIG are temperature sensitive so the rotation will change due to temperature variations. Various techniques have been used to improve the degree of isolation by minimizing these deviations from 45° rotation. In the case of YIG, gadolinium substitution for part of the yttrium lowers the temperature coefficient of the rotation, but at the expense of its magnitude. The wavelength dependence can be partially compensated by a second element having $-45°$ of reciprocal type rotation Such an element can be made from an optically active crystal. The two-element combination between crossed polarizers would be used as an isolator. For one direction of propagation the opposite rotations would always sum to zero if they had identical wavelength dependences. But for the opposite direction of propagation both elements would have $-45°$ of rotation which would sum to $-90°$ with a doubled wavelength variation. The isolator would therefore have a wavelength dependent insertion loss.

The cross-referenced application, discloses a quasi-achromatic configuration of two Faraday elements and five birefringent plates which when suitably oriented between two linearly polarizing elements would constitute an optical isolator or circulator. The nominal Faraday rotations of the two elements are 45° and 90° at a center design wavelength about which the devices are to operate. Changes in these rotations due to either wavelength or temperature variations compensate one another because of their coupling by the birefringent plates. In this way a higher degree of isolation is obtained over a wider optical bandwidth than would be possible in a device using a single 45° Faraday element. A group of three plates is used between the two Faraday elements and two more follow them to give the required polarization transformations which must themselves be quasi-achromatic over the desired wavelength range.

SUMMARY OF THE INVENTION

The principal object of the present invention is a quasi-achromatic configuration of nonreciprocal Faraday elements which does not require multiple birefringent plates and which is suitable for use in an optical isolator or optical circulator.

Another object is a simplified nonreciprocal optical configuration that compensates for changes in the rotation of its Faraday elements due to either wavelength or temperature variations.

These and other objects of the invention are achieved by an optical configuration of two nonreciprocal Faraday elements coupled bY linear retardation elements based on total internal Fresnel reflection such that wavelength or temperature effects on the Faraday elements compensate one another to give quasi-achromatic isolation and/or temperature stability when this optical configuration is incorporated into an optical isolator or circulator.

In a first aspect of the invention, a nonreciprocal optical wavelength filter through which a light beam within a wavelength range can propagate consists of an input polarization filter, through which the beam enters said filter, an alternating sequence of wavelength dependent nonreciprocal circularly birefringent elements and wavelength independent linear retardation elements, through which the beam is propagated, and an output polarization filter through which said beam exits the filter.

In a second aspect of the invention, a quasi-achromatic optical isolator through which a light beam within a wavelength range about a nominal wavelength may propagate is made from a sequence of elements having a first plane polarizer accepting said light beam as an input, said light beam then passing through in sequence, a first Faraday rotator, a first wavelength independent linear retardation element, a second Faraday rotator, a second wavelength independent linear retardation element, and said light beam exiting said isolator undiminished in intensity through a second plane polarizer.

In a third aspect of the invention, a quasi-achromatic optical circulator having first, second, third and fourth ports is provided such that said circulator may accept a light beam within a wavelength range about a nominal wavelength and direct it to a succeeding port. A light beam enters said circulator through a first polarizing beam splitter adjacent to said first and third ports and passes through sequentially a first Faraday rotator, a first wavelength independent linear retardation element, a second Faraday rotator, a second wavelength independent linear retardation element and a second polarizing beam splitter adjacent to said second and fourth ports of said circulator, whereby said light beam is transmitted undiminished in intensity to the next succeeding port.

In another aspect of said invention, said wavelength independent linear retardation elements of said isolator and circulator are optically transparent isotropic prisms within which said beam undergoes total internal reflection.

In another aspect of said invention, said first and second prisms have refractive indicies between 1.69 and 1.81 and said light beam is deflected 90 degrees by total internal reflection at an angle of incidence of 45 degrees within said first and second prisms in a common plane of incidence parallel to the x axis whereby said light beam experiences linear retardations between 58 and 64 degrees with fast axes parallel to the x axis within said prisms.

BRIEF DESCRIPTION OF THE DRAWINGS

FIGS. 4a and 7b are Poincare sphere diagrams on which are represented the polarization transformations of the optical isolator of FIG. 3 operating in the forward and reverse directions respectively;

DESCRIPTION OF THE PREFERRED EMBODIMENT

This application pertains generally to the field of nonreciprocal optical devices such as optical isolators and optical circulators, which are constructed from materials that exhibit the optical Faraday effect. Optical isolators are commonly used to overcome the instability in semiconductor light sources caused by reflected light. Optical circulators may be used in two-way fiber optic communication systems and in other applications. In particular, this application pertains to quasi-achromatic isolators and circulators using total internal Fresnel reflection to simplify their construction.

Figure 1:
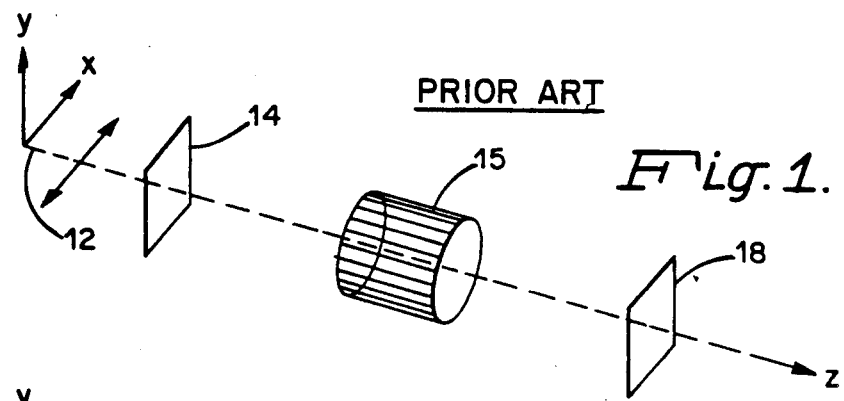
FIG. 1 is a schematic view of a typical optical isolator of the prior art.

The basic prior art nonreciprocal configuration of an optical isolator uses a single 45° Faraday element, as shown in FIG. 1. An input light beam 12 propagates along the +z axis in a right hand coordinate system and passes in turn through plane polarizer 14, Faraday rotation element 15, and output plane polarizer 18.

Beam 12 is plane polarized at an angle of 0° to the x axis and passes through polarizer 14 unchanged. Within Faraday rotation element 15 which includes its axial field producing magnet, the plane of polarization is rotated to an angle of +45° from the x axis. Output polarizer 18 is oriented at +45° to pass beam 12 undiminished in intensity. A reverse direction beam would initially be polarized at +45° so as to pass through polarizer 18 unchanged. Within Faraday rotation element 15 the polarization direction of the beam would be rotated to an angle of +90° so that it would be completely absorbed by polarizer 14. Thus, the device functions as an isolator because it transmits light propagating in the +z direction and absorbs light propagating in the −z direction.

A rotator element is considered to have a positive rotation if the polarization axes rotate in a counterclockwise direction as the oncoming light beam is observed. In the above description of a simple optical isolator, the polarization axes were rotated from x toward y for both propagation directions, but according to the above definition this corresponds to a +45° rotation for the +z direction and a −45° rotation for the −z direction. This is the behavior of the Faraday effect. A reciprocal rotation element on the other hand has the same polarity of rotation for both propagation directions. Light propagating in an optically active element, for example, would have its polarization axes rotated, but if the direction of propagation were reversed the polarization axes would retrace the orientations traced during their forward path.

In the present invention, deviations of the rotation of the Faraday element from 45° resulting from wavelength changes or from temperature variations are compensated for by a second Faraday rotation element composed of the same material. The compensation is equally effective for both directions of propagation because the polarities of the rotations of both Faraday elements change sign together and have exactly proportional wavelength and temperature dependencies. In this way isolator and circulator devices may be constructed that are relatively insensitive to temperature variations and which can operate over a wider wavelength range with a higher degree of isolation than can devices constructed with a single Faraday element.

The cross-referenced application disclosed, using the Poincare sphere representation of polarization states, how the technique used by Destriau and Prouteau to construct a quasi-achromatic quarter-wave plate may be adapted to obtain a quasi-achromatic optical isolator and circulator. On the Poincare sphere equatorial points represent linear polarization states with the optical electric field orientation varying from 0° to 180°. The north and south poles represent right and left circular polarization states respectively, while all other points represent states of elliptical polarization. The utility of this Poincare sphere representation results from the fact that a polarization transformation produced by a birefringent element is represented by a circular path around an axis representing the principal polarization modes of the element. Linearly birefringent plates, for example, produce polarization transformations represented on the sphere by circular arcs around equatorial axes, while circularly birefringent elements such as reciprocal or nonreciprocal rotators produce polarization transformations represented on the sphere by circular arcs around the polar axis.

Figure 2:
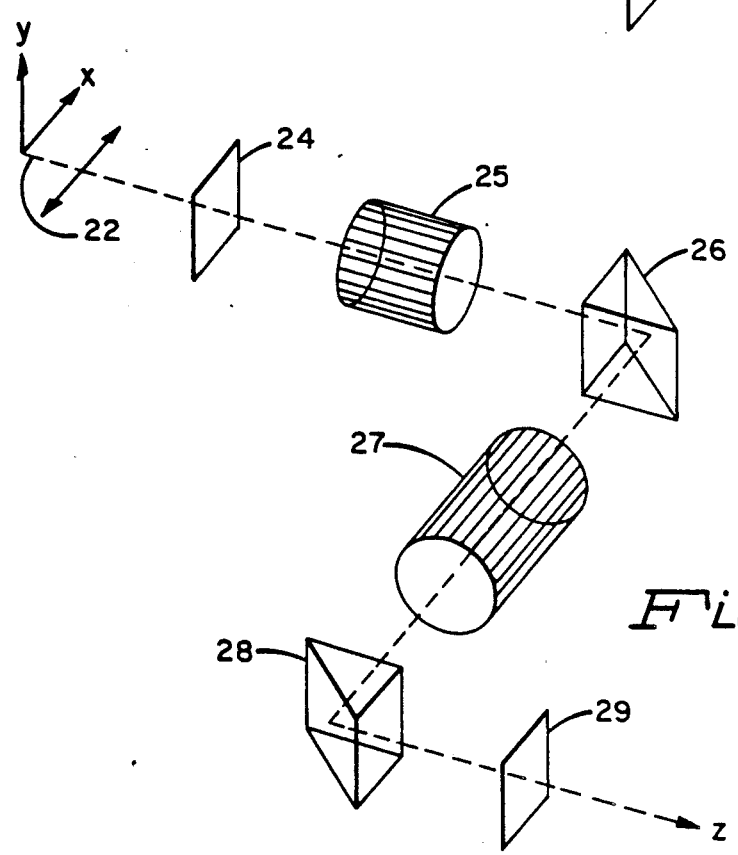
FIG. 2 is a schematic view of the quasi-achromatic optical isolator using total internal Fresnel reflections, according to a first embodiment of the present invention.

An isolator constructed according to the present invention is shown in FIG. 2. Input light beam 22 propagates along the +z axis in a right hand coordinate system and passes in turn through plane polarizer 24, Faraday rotation element 25, reflecting prism 26, Faraday rotation element 27, reflecting prism 28, and output plane polarizer 29. Beam 22 is plane polarized at an angle of 0° to the x axis and passes through polarizer 24 unchanged. Within Faraday rotation element 25, which includes its axial field producing magnet, the plane of polarization is rotated to an angle of +45° from the x axis. The second Faraday rotation element 27, which also includes its axial field producing magnet, has a rotation angle of −90°. Within both prisms 26 and 28, beam 22 undergoes total internal reflection such that its two orthogonal linear polarization components at 0° and 90° experience a differential phase shift of approximately 60°. Output polarizer 29 is oriented at +135° from the x axis.

Figure 3:
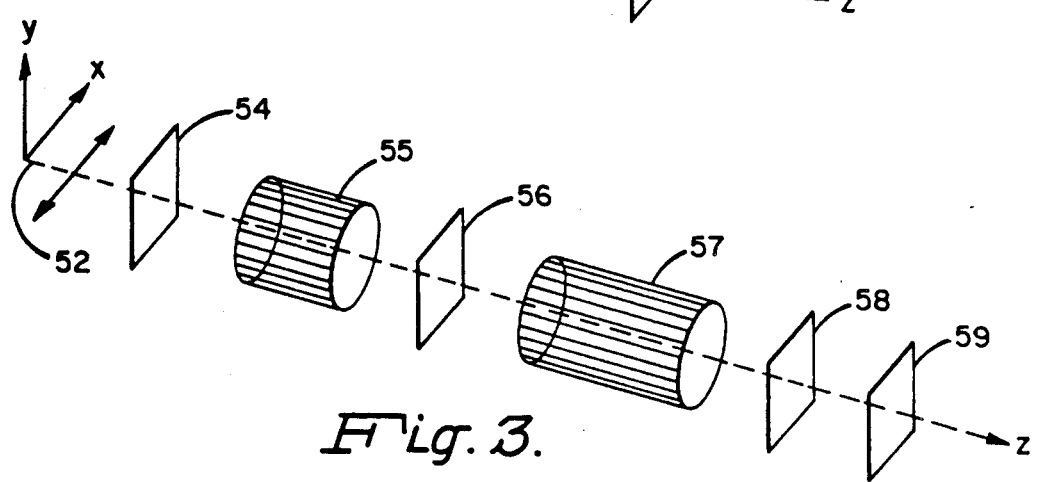
FIG. 3 is a schematic view of one embodiment of a quasi-achromatic optical isolator disclosed in the cross-referenced application.
Figure 4A:
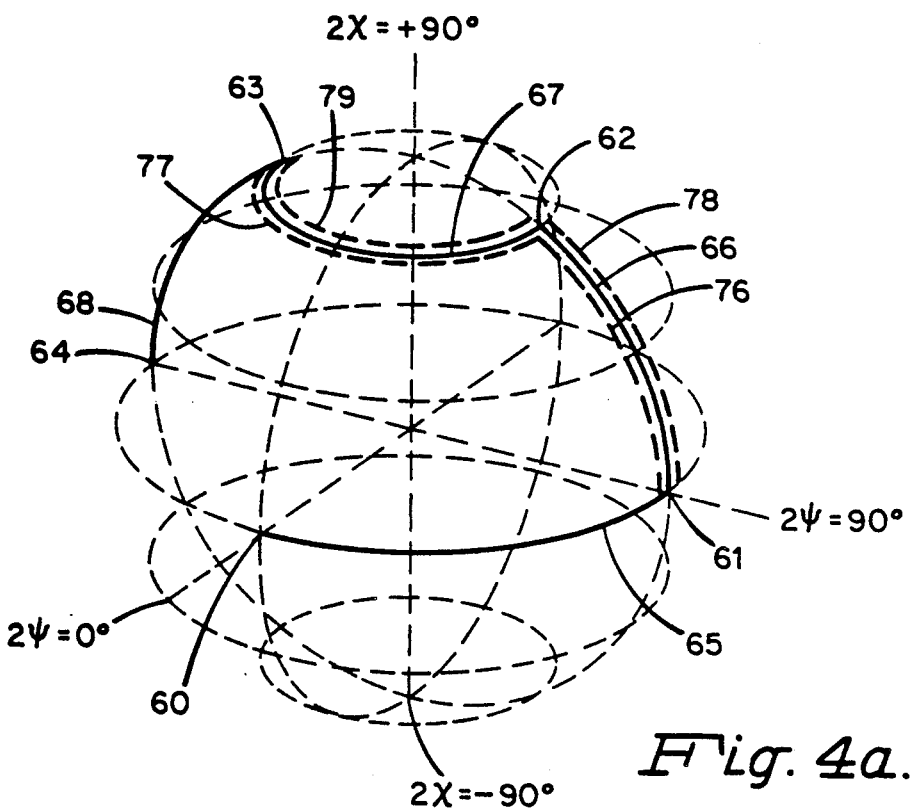
Figure 5:
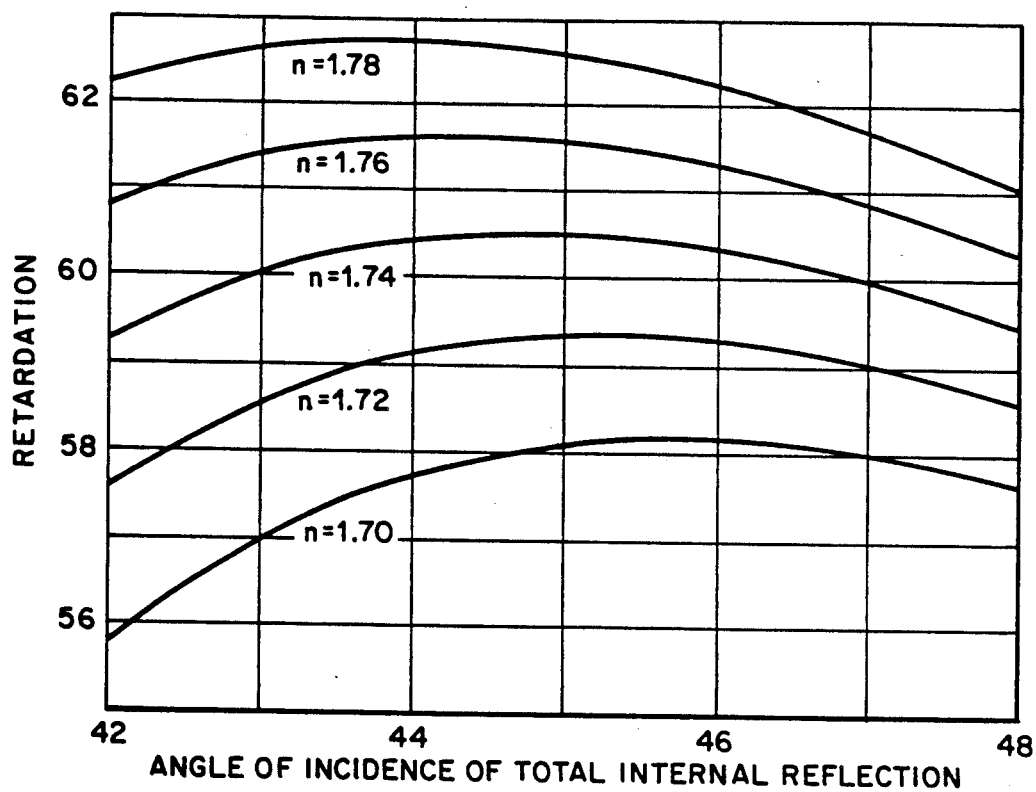
FIG. 5 is a plot of the retardation versus angle of incidence of total internal Fresnel reflection for the embodiment of FIG. 2.

The state of the art relative to the present invention is the configuration shown in FIG. 3 taken from the previously cross-referenced application, in which it appears as FIG. 5. Input light beam 52 propagates along the +z axis in a right hand coordinate system and passes in turn through plane polarizer 54, Faraday rotation element 55, linearly birefringent plate 56, Faraday rotation element 57, birefringent plate 58 and output plane polarizer 59. Beam 52 is plane polarized at an angle of 0° to the x axis and passes through polarizer 54 unchanged. Faraday rotation elements 55 and 57 have rotations of +45 and −90°, respectively, obtained by oppositely orienting their associated axial field magnets relative to the beam direction, and plates 56 and 58 have retardations of +60° with their fast axes oriented at +90° from the x axis. The polarization transformations that take place in elements 55, 56, 57, and 58 are represented on the Poincare sphere diagram of FIG. 4a (FIG. 6a in the cross-referenced application) in terms of the spherical coordinates $2\Psi$ and $2\chi$, where $\Psi$ is the orientation of the major elliptic axis and $\chi$ is the ellipticity. The latter is the arc tangent of the elliptic axis ratio and is 45° for circularly polarized light.

The radii of +90 and −180° arcs and 65 and 67 of FIG. 4a are proportional to the cosines of their $2\chi$ values which are 0° and 60° respectively. Since the radius of the −180° arc is half that of the +90° arc, the arc lengths are equal but opposite in sense. If the Faraday rotations that they represent each change by a proportional amount due to wavelength or temperature variations, the lengths of arcs 65 and 67 will both change by equal amounts. Arc 65 represents the nominal +45° Faraday rotation by element 55 from the input linear polarization state at point 60 to point 61. A change in its length causes the following 60° arc 66 which represents the transformation by plate 56 to move to a new position 76 or 78 while remaining centered about an equatorial axis through point 60. Both endpoints of arc 66 move by equal distances, and so the equal change in the length of arc 67 compensates that of arc 65, thereby leaving endpoint 63 of arc 67 representing the −90° Faraday rotation by element 57 invariant. Proportional changes in the retardations of plates 56 and 58 due to temperature or wavelength variations will cause the lengths of arcs 66 and 68 to change by equal amounts. These will cause arc 67 to move to a new position 77 or 79, but point 64 representing the linear output polarization state at an angle of +135° from the x axis will remain invariant. Output polarizer 59 is oriented at +135° to pass beam 52 undiminished in intensity.

Figure 4B:
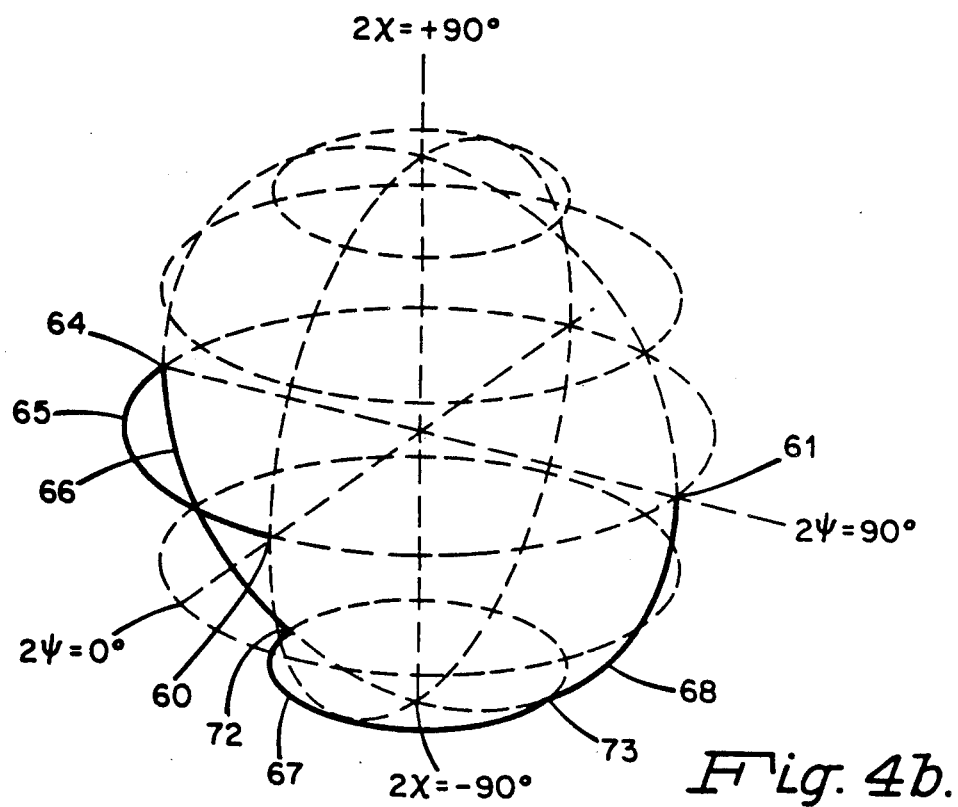
Figure 6A:
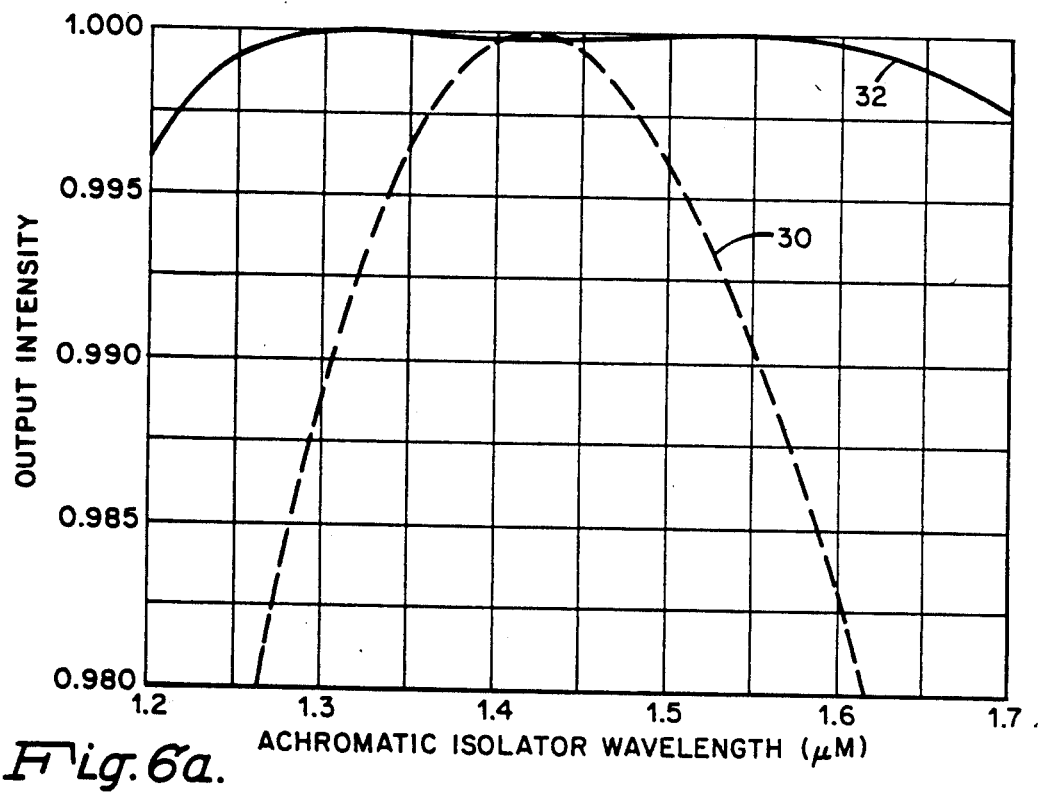
FIGS. 6a and 6b are plots of the transmission functions in the forward and reverse directions respectively for the prior art isolator of FIG. 1 and the embodiment of the present invention illustrated in FIG. 2.
Figure 6B:
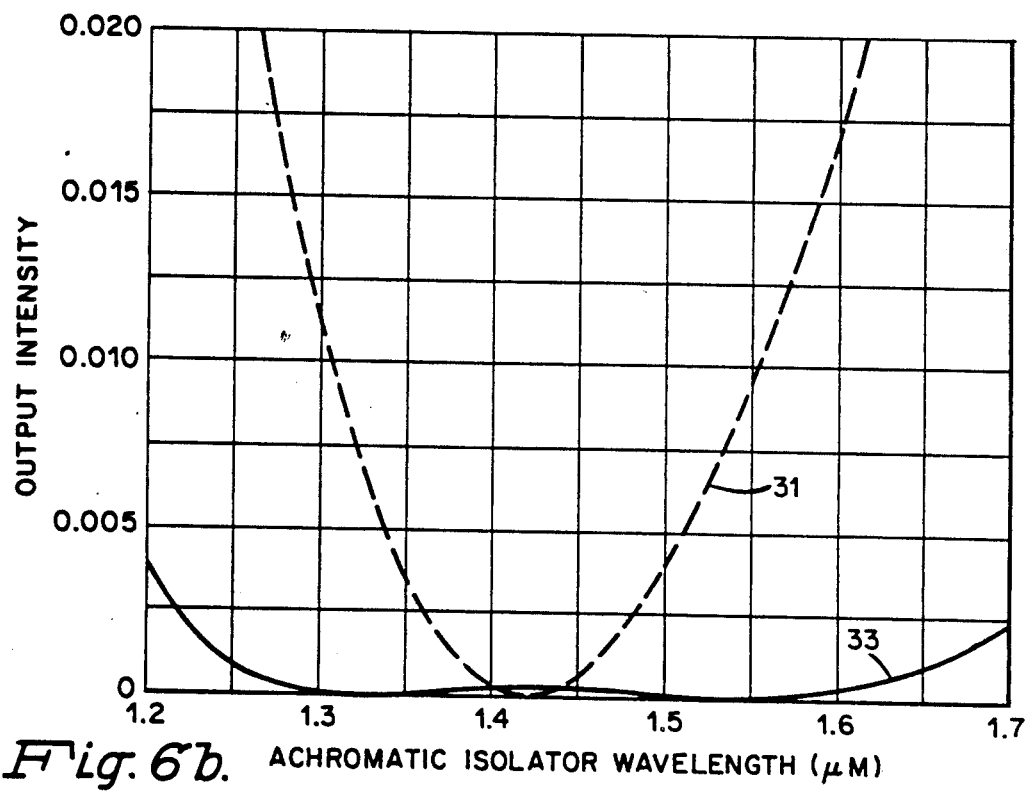

The operation of the isolator of FIG. 3 in the reverse direction is equivalent to reversing the polarity of both Faraday rotators The polarization transformations are then represented by the Poincare sphere diagram of FIG. 4b (FIG. 6b of the cross-referenced application). The −90° arc 65 represents the −45° Faraday rotation in element 55 from the input linear polarization state 60 at $2\Psi=0$, $2\chi=0$, to the linear state 64 at $2\Psi=+270$, $2\chi=0$. The $+60°$ arc 66 represents the transformation in plate 56 to the elliptical state 72 at $2\Psi=+270$, $2\chi=-60$. The $+180°$ arc 67 represents the $+90°$ Faraday rotation in element 57 to the elliptical state 73 at $2\Psi=90$, $2\chi=-60$. The $+60°$ degree arc 68 represents the transformation in plate 58 to the linear polarization state 61 at $2\Psi=+90$, $2\chi=0$. Output polarizer 59 oriented at $+135$ degrees completely absorbs beam 52.

The above discussion based on the geometry of the Poincare sphere representation of the isolators of FIG. 3 indicates how proportional changes in the rotations of the two Faraday elements and the retardations of the two linearly birefringent plates compensate one another. But the isolator is not completely temperature insensitive nor achromatic because of higher order effects not readily quantified using the Poincare sphere. For this purpose, the Jones matrix method of birefringent network analysis is better suited. In the cross-referenced application, it was shown that it is possible to achieve optimum isolation at two wavelengths oppositely displaced from the nominal center wavelength if each birefringent plate of FIG. 3 is replaced by a quasi-achromatic combination of birefringent plates that gives the required polarization transformations. For example, if the Faraday rotators and linearly birefringent elements have their nominal values at 1.42 $\mu$, it would be desirable to design the isolator for maximum isolation at 1.31 $\mu$ and 1.55 $\mu$ because wavelengths close to these values fall within the so-called transmission windows of optical fibers commonly used in communication systems.

In the present invention shown in FIG. 2, the retardation of each birefringent plate of FIG. 3 is replaced by the optical retardation between linear polarization states obtained from the differential phase shift accompanying total internal Fresnel reflection in prisms 26 and 28. Beam 22 enters and leaves prisms 26 and 28 at normal incidence, but is reflected internally at a 45 degree angle of incidence by the uncoated hypotenuse face of the 45° right angle prisms. The retardations obtainable within a right angle prism are shown in FIG. 5. By constructing the prisms from glass having an index of refraction between 1.69 and 1.81 retardations between 58° and 64° may be obtained that are insensitive to the angle of incidence near 45°. Wavelength affects the retardation only by virtue of the small dispersion of the index of refraction of the glass.

In the cross-referenced application, the techniques of birefringent filter synthesis were discussed and related to the shaping of the transmission function of the double Faraday element nonreciprocal configuration essential to the quasi-achromatic isolators and circulators. Specifically, it was shown that if the 60° retardations of the two birefringent plates 56 and 58 of FIG. 3 were respectively increased by 1.3° and decreased half as much by 0.65°, the transmission versus wavelength would have the optimum value of 1.0 at 1.31 $\mu$ and 1.55 $\mu$ near the ends of a broad region of quasi-achromatic operation.

This operation is achieved in the present invention of FIG. 2 by choosing the refractive indices of glass prisms 26 and 28 to be 1.756 and 1.721 respectively. The corresponding essentially achromatic retardations that take place upon total internal reflection at 45° arc 61.30° in prism 26 and 59.35° in prism 28. These retardations are such that their fast axes are the TM polarization states and lie in the plane of incidence of the reflection and are therefore parallel to the x axis at 0°. This differs from the 90° fast axis orientations of plates 56 and 58 in FIG. 3. But the polarization changes that take place, however are similar to those shown on the Poincare sphere diagrams of FIGS. 4a and 4b, except that in both the forward and reverse directions the elliptical polarization states are reversed and would lie in the lower hemisphere of FIG. 4 and in the upper hemisphere of FIG. 4b respectively. The forward and reverse transmissions of the isolator configurations of FIGS. 1 and 2 were computed as a function of wavelength using the known dispersions of the Faraday rotation and the achromatic retardations specified aboVe for the two glass prisms. FIG. 6a shows the forward transmission of the single Faraday element isolator of FIG. 1 as curve 30 while curve 32 shows the forward transmission of the present invention of FIG. 2. The latter transmission function is quasi-achromatic, that is, it remains essentially flat and equal to unity over an extended wavelength range and is significantly closer to unity within the 1.28 $\mu$ to 1.60 $\mu$ region of interest. Similarly, FIG. 6b shows the reverse transmission of the same two isolators as curves 31 and 33 respectively. These functions determine the degree of optical isolation attainable. Curve 33 remains below 0.0005 within the 1.28 $\mu$ to 1.60 $\mu$ wavelength range and this represents an isolation of $-33$ dB. Within the same range curve 31 of the single Faraday element isolator reaches 0.017 transmission for an isolation of only $-17.7$ dB.

Figure 7:
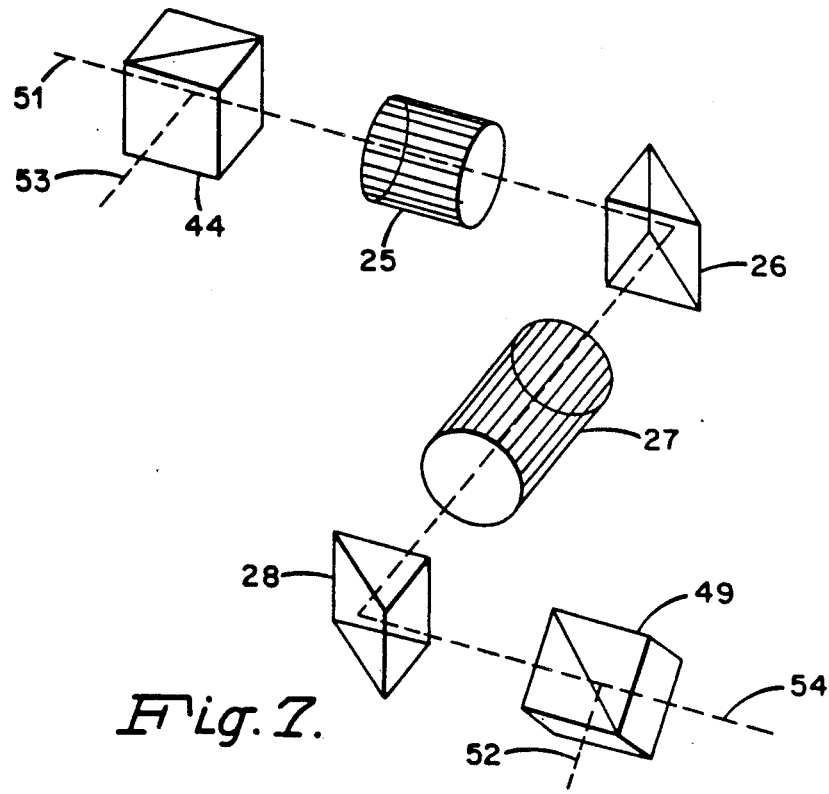
FIG. 7 is a schematic view of the preferred embodiment of a quasi-achromatic optical circulator using total internal Fresnel reflection according to the invention.

A circulator may be derived from the isolator of FIG. 2 by replacing polarizers 24 and 29 by polarizing beam splitters 44 and 49 as shown in FIG. 7. Each may be a glass cube prism with a diagonal interface containing a multilayer dielectric coating that reflects the TE and transits the TM polarization states. The four input and/or output beams 51, 52, 53, and 54 are the four ports of the circulator and beams entering each port must be plane polarized for proper operation.

What is claimed is:

1. A nonreciprocal optical wavelength filter comprising:
   input polarization filtering means accepting an input beam;
   an alternating sequence of wavelength dependent Faraday rotators and wavelength independent linear retardation elements through which said beam propagates;
   output polarization filtering means through which said beam exits.

2. The optical wavelength filter of claim 1 wherein said wavelength independent linear retardation elements are optically transparent isotropic prisms within which said beam undergoes total internal reflection.

3. The optical wavelength filter of claim 2 wherein said optically isotropic transparent prisms are comprised of glass.

4. A quasi-achromatic optical isolator through which a light beam within a wavelength range about a nominal wavelength may propagate and comprising in sequence:
   a first plane polarizer accepting said light beam as input;
   a first Faraday rotator receiving the light beam which has passed through said first plane polarizer;
   a first wavelength independent linear retardation element receiving the light beam which has passed through said first Faraday rotator;
   a second Faraday rotator receiving the light beam which has passed through said first linear retardation element;

a second wavelength independent linear retardation element receiving the light beam which has passed through said second Faraday rotator; and a second plane polarizer receiving the light beam which has passed through said second wavelength independent linear retardation element, transmitting said light beam undiminished in intensity, and exiting said light beam as output.

5. The isolator of claim 4 wherein said wavelength independent linear retardation elements are optically transparent isotropic prisms within which said beam undergoes total internal reflection.

6. The isolator of claim 5 wherein said optically isotropic transparent prisms are comprised of glass.

7. The optical isolator of claim 5 wherein:
said first Faraday rotator has a rotation angle of +n degrees; and
said second Faraday rotator has a rotation angle of −2n degrees.

8. The optical isolator of claim 7 wherein:
said first and said second prisms have refractive indicies between 1.69 and 1.81; and
said beam is deflected 90 degrees by total internal reflection at an angle of incidence of 45 degrees within said first and said second prisms in a common plane of incidence parallel to the polarization axis of said first polarizer; whereby
said beam experience linear retardations between 58 and 64 degrees with fast axes parallel to said polarization axis within said first and said second prisms.

9. The optical isolator of claim 7 wherein:
said first and said second prisms have refractive indicies between 1.69 and 1.81; and
said beam is deflected 90 degrees by total internal reflection at an angle of incidence of 45 degrees within said first and said second prisms in a common plane of incidence perpendicular to the polarization axis of said first polarizer; whereby
said beam experiences linear retardations between 58 and 64 degrees with fast axes perpendicular to said polarization axis within said first and said second prisms.

10. The optical isolator of claims 8 or 9 wherein:
n = +45 degrees at said nominal wavelength; and the orientation of the polarization axis of said second plane polarizer is equal to −45 degrees.

11. The optical isolator of claims 8 or 9 wherein:
n = −45 degrees at said nominal wavelength; and the orientation of the polarization axis of said second plane polarizer is equal to +45 degrees.

12. The optical isolators of claims 8 or 9 wherein the transmission in the forward direction from said first port to said second port and the isolation in the reverse direction from said second port to said first port are optimized at two wavelengths oppositely displaced from said nominal wavelength by selecting the refractive indicies of said first and second prisms such that the linear retardation accompanying total reflection is increased from 60 degrees by an amount less than 4 degrees in said first prism and decreased from 60 degrees by half of said amount in said second prism.

13. The optical isolator of claim 7 wherein said Faraday rotators are composed of the same material such that they have exactly proportional wavelength and temperature dependencies, thereby compensating for wavelength changes and temperature variations.

14. A quasi-achromatic optical circulator having first, second, third, and fourth ports that may accept a light beam within a wavelength range about a nominal wavelength and direct it to a succeeding port comprising:
a first polarizing beam splitter adjacent said first and said third ports of said circulator;
a first Faraday rotator receiving a light beam which has passed through said first polarizing beam splitter;
a first wavelength independent linear retardation element receiving the light beam which has passed through said first Faraday rotator;
a second Faraday rotator receiving the light beam which has passed through said first linear retardation element;
a second wavelength independent linear retardation element receiving the light beam which has passed through said second Faraday rotator; and
a second polarizing beam splitter adjacent said second and said fourth ports of said circulator for receiving the light beam which has passed through said second wavelength independent linear retardation element and transmitting said light beam undiminished in intensity to said succeeding port.

15. The circulator of claim 14 wherein said wavelength independent linear retardation elements are optically transparent isotropic prisms within which said beam undergoes total internal reflection.

16. The circulator of claim 15 wherein said optically isotropic transparent prisms are comprised of glass.

17. The optical circulator of claim 16 wherein:
said first Faraday rotator has a rotation angle of +n degrees; and
said second Faraday rotator has a rotation angle of −2n degrees.

18. The optical circulator of claim 17 wherein:
said first and said second prisms have refractive indicies between 1.69 and 1.81; and
said beam is deflected 90 degrees by total internal reflection at an angle of incidence of 45 degrees within said first and said second prisms in a common plane of incidence parallel to the polarization axis of said first polarizing beam splitter whereby
said beam experience linear retardations between 58 and 64 degrees with fast axes parallel to said polarization axis within said first and said second prisms.

19. The optical circulator of claim 18 wherein:
n = +45 degrees at said nominal wavelength; and the orientation of the polarization axis of said second polarizing beam splitter is equal to −45 degrees.

20. The optical circulator of claim 18 wherein:
n = −45 degrees at said nominal wavelength; and the orientation of the polarization axis of said second polarizing beam splitter is equal to +45 degrees.

21. The optical circulator of claim 17 wherein said Faraday rotators are composed of the same material such that they have exactly proportional wavelength and temperature dependencies, thereby compensating for wavelength changes and temperature variations.

22. The optical circulator of claim 18 wherein the transmission in the forward direction between succeeding ports and the isolations between non succeeding ports are optimized at two wavelengths oppositely displaced from said nominal wavelength by selecting the refractive indicies of said first and second prisms such that the linear retardation accompanying total reflection is increased from 60 degrees by an amount less than 4 degrees in said first prism and decreased from 60 degrees by half of said amount in said second prism.

* * * * *